United States Patent
Zenzai et al.

(10) Patent No.: US 11,205,542 B2
(45) Date of Patent: Dec. 21, 2021

(54) MULTILAYER CERAMIC ELECTRONIC COMPONENT

(71) Applicant: Murata Manufacturing Co., Ltd., Nagaokakyo (JP)

(72) Inventors: Kota Zenzai, Nagaokakyo (JP); Yosuke Terashita, Nagaokakyo (JP); Atsushi Nakamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 50 days.

(21) Appl. No.: 16/897,322

(22) Filed: Jun. 10, 2020

(65) Prior Publication Data
US 2021/0057155 A1 Feb. 25, 2021

(30) Foreign Application Priority Data
Aug. 20, 2019 (JP) .............................. JP2019-150401

(51) Int. Cl.
*H01G 4/232* (2006.01)
*H01G 4/008* (2006.01)
*H01B 1/22* (2006.01)
*H01G 4/30* (2006.01)
*H01G 4/12* (2006.01)

(52) U.S. Cl.
CPC ............. *H01G 4/008* (2013.01); *H01B 1/22* (2013.01); *H01G 4/12* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 8,988,854 B1* | 3/2015 | Zenzai | .................. | H01G 4/232 361/303 |
| 9,520,236 B2* | 12/2016 | Ikeda | ..................... | H01G 4/228 |
| 2015/0172108 A1* | 6/2015 | Song | .................. | H04L 41/0233 709/203 |
| 2016/0141103 A1* | 5/2016 | Hamanaka | ............. | H01G 4/232 361/301.4 |
| 2016/0172108 A1 | 6/2016 | Ikeda et al. | | |
| 2018/0090276 A1* | 3/2018 | Ito | ......................... | H01G 4/232 |
| 2021/0057155 A1* | 2/2021 | Zenzai | ..................... | H01B 1/22 |

FOREIGN PATENT DOCUMENTS

JP 2015-046644 A 3/2015

* cited by examiner

*Primary Examiner* — Dion R. Ferguson
(74) *Attorney, Agent, or Firm* — Keating & Bennett, LLP (57) ABSTRACT

A multilayer ceramic electronic component includes a ceramic element assembly and outer electrodes provided on respective end surfaces of the ceramic element assembly. Each outer electrode includes an underlying electrode layer that is provided on the ceramic element assembly and that includes a sintered metal and glass and a conductive resin layer that is provided on the underlying electrode layer and that includes a metal filler and a resin. The underlying electrode layer satisfies at least one condition of a condition that a maximum exposure length of the glass exposed at the interface between the underlying electrode layer and the conductive resin layer is about 3.8 μm or less and a condition that an exposure rate of the glass exposed at the interface between the underlying electrode layer and the conductive resin layer is about 10.1% or less.

13 Claims, 6 Drawing Sheets

FIG. 5B a-PORTION MAGNIFIED VIEW

MULTILAYER CERAMIC ELECTRONIC COMPONENT

CROSS REFERENCE TO RELATED APPLICATIONS

This application claims the benefit of priority to Japanese Patent Application No. 2019-150401 filed on Aug. 20, 2019. The entire contents of this application are hereby incorporated herein by reference.

BACKGROUND OF THE INVENTION

1. Field of the Invention

The present invention relates to a multilayer ceramic electronic component.

2. Description of the Related Art

To date, a multilayer ceramic electronic component described in Japanese Unexamined Patent Application Publication No. 2015-46644 is known. The multilayer ceramic electronic component includes a ceramic element assembly that includes an inner electrode and that has a pair of principal surfaces opposite to each other, a pair of side surfaces opposite to each other, and a pair of end surfaces opposite to each other. An outer electrode is disposed on the end surface of the ceramic element assembly so as to be coupled to the inner electrode and is disposed so as to extend from the end surface to cover part of each of the pair of principal surfaces and part of each of the pair of side surfaces.

The outer electrode includes an underlying electrode layer disposed on the ceramic element assembly and a conductive resin layer disposed on the underlying electrode layer. In the conductive resin layer, a metal filler is dispersed in a resin. The conductive resin layer can improve the bending strength and the impact resistance of the multilayer ceramic electronic component.

The underlying electrode layer is disposed between the conductive resin layer and the ceramic element assembly and contains a sintered metal and glass. The glass is contained for the purpose of decreasing the baking temperature (sintering aid) and enhancing the close-contact strength with respect to the ceramic element assembly. Therefore, the glass is present at the interface between the underlying electrode layer and the conductive resin layer.

However, regarding the multilayer ceramic electronic component including the outer electrode that includes the conductive resin layer, when the amount of bending increases, cracks may occur in the ceramic element assembly. Since a starting point of a crack is the glass, it is conjectured that an occurrence of a crack relates to the exposure state of the glass exposed at the interface between the underlying electrode layer and the conductive resin layer.

SUMMARY OF THE INVENTION

Preferred embodiments of the present invention provide multilayer ceramic electronic components in each of which cracks do not readily occur even when the amount of bending increases.

A multilayer ceramic electronic component according to a preferred embodiment of the present invention includes a ceramic element assembly that includes a first inner electrode and a second inner electrode and that includes a first principal surface and a second principal surface opposite to each other, a first side surface and a second side surface opposite to each other in the direction orthogonal or substantially orthogonal to the direction bonding the first principal surface and the second principal surface, and a first end surface and a second end surface opposite to each other in the direction orthogonal or substantially orthogonal to the direction bonding the first principal surface and the second principal surface and in the direction orthogonal or substantially orthogonal to the direction bonding the first side surface and the second side surface, a first outer electrode that is provided on the first end surface of the ceramic element assembly, that is electrically coupled to the first inner electrode, and that extends from the first end surface to cover a portion of each of the first principal surface, the second principal surface, the first side surface, and the second side surface, and a second outer electrode that is provided on the second end surface of the ceramic element assembly, that is electrically coupled to the second inner electrode, and that extends from the second end surface to cover a portion of each of the first principal surface, the second principal surface, the first side surface, and the second side surface, wherein the first outer electrode includes a first underlying electrode layer that is provided on the ceramic element assembly and that includes a sintered metal and glass and a first conductive resin layer that is provided on the first underlying electrode layer and that includes a metal filler and a resin, the second outer electrode includes a second underlying electrode layer that is provided on the ceramic element assembly and that includes a sintered metal and glass and a second conductive resin layer that is provided on the second underlying electrode layer and that includes a metal filler and a resin, the first underlying electrode layer satisfies at least one condition of a first condition that a maximum exposure length of the glass exposed at the interface between the first underlying electrode layer and the first conductive resin layer is about 3.8 µm or less and a second condition that an exposure rate of the glass exposed at the interface between the first underlying electrode layer and the first conductive resin layer is about 10.1% or less, and the second underlying electrode layer satisfies at least one condition of a third condition that a maximum exposure length of the glass exposed at the interface between the second underlying electrode layer and the second conductive resin layer is about 3.8 µm or less and a fourth condition that an exposure rate of the glass exposed at the interface between the second underlying electrode layer and the second conductive resin layer is about 10.1% or less.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

1. Multilayer Ceramic Electronic Component

Figure 1:
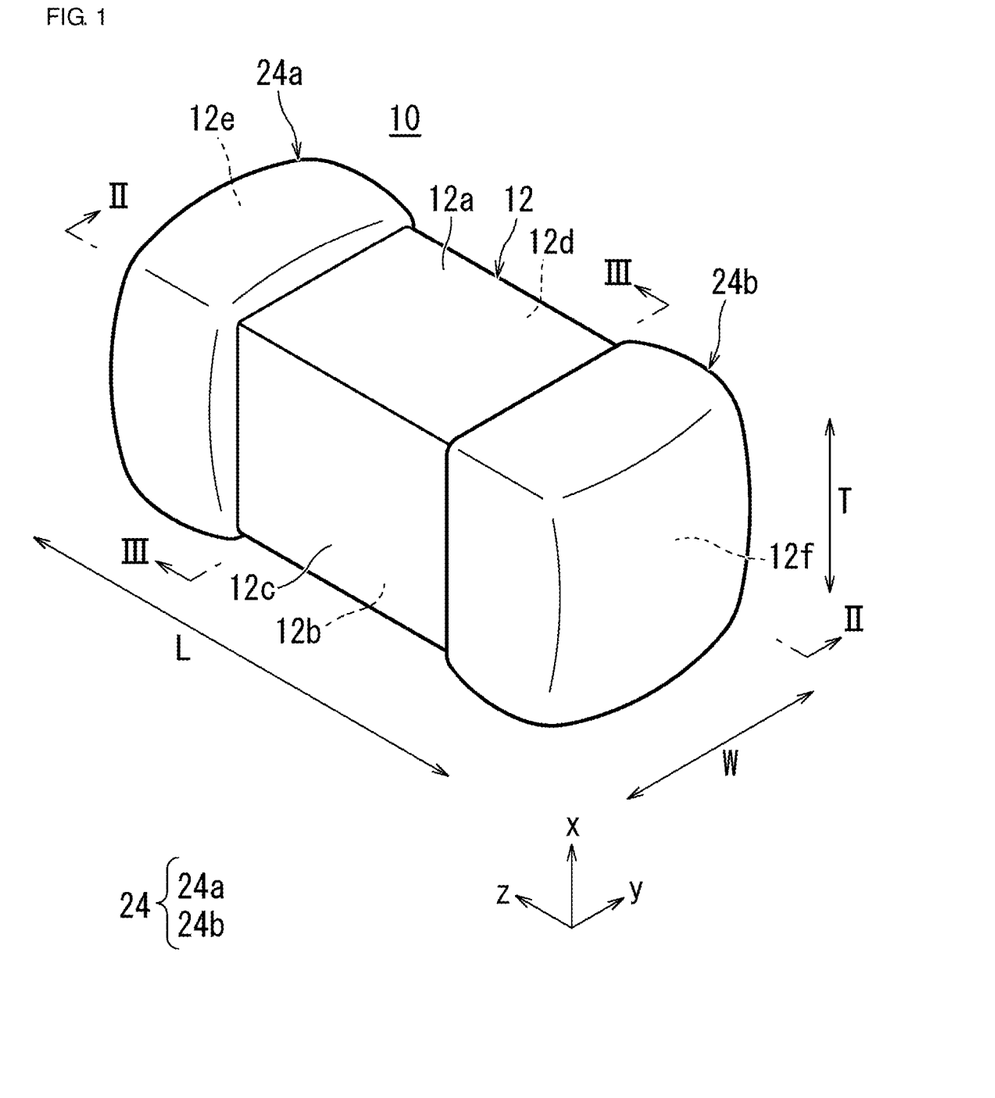
FIG. 1 is an external perspective view showing an example of a multilayer ceramic electronic component according to a preferred embodiment of the present invention.
Figure 2:
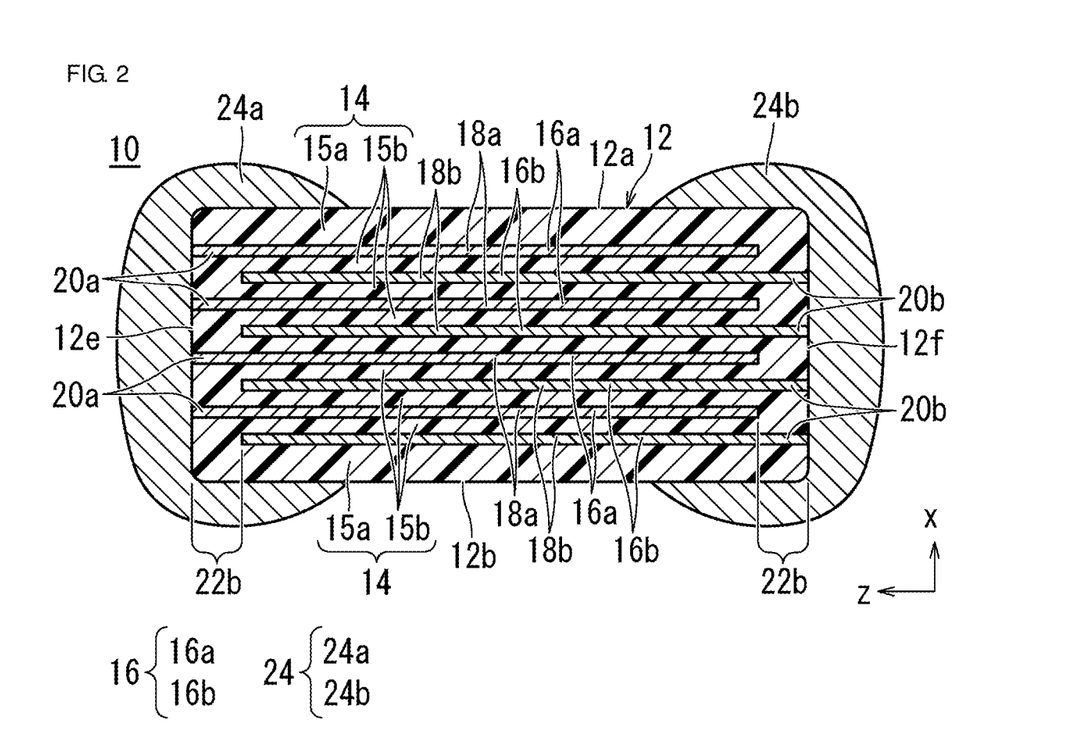
FIG. 2 is a sectional view of the section cut along line II-II in FIG. 1.
Figure 3:
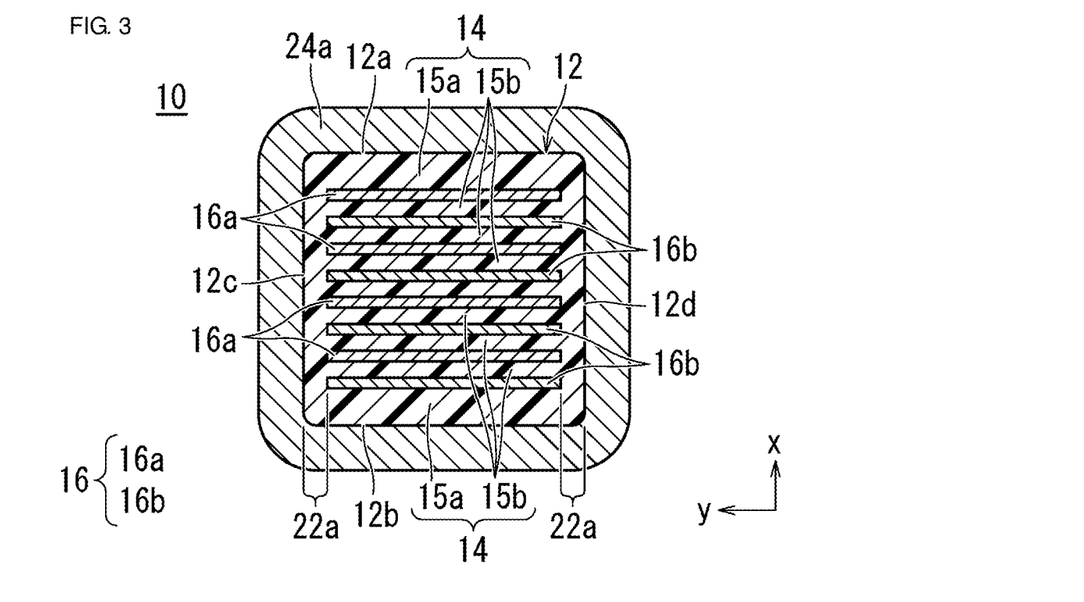
FIG. 3 is a sectional view of the section cut along line in FIG. 1.
Figure 4A:
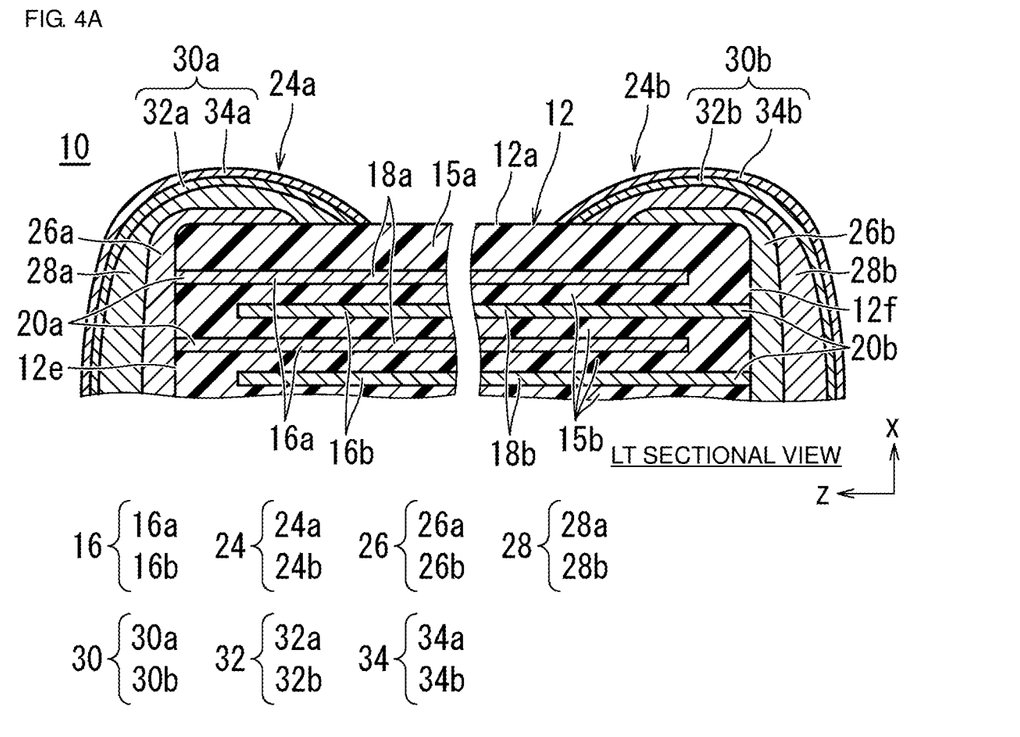
FIGS. 4A to 4C are magnified sectional views of outer electrodes and the vicinities thereof shown in the sectional view in FIG. 2.
Figure 4B:
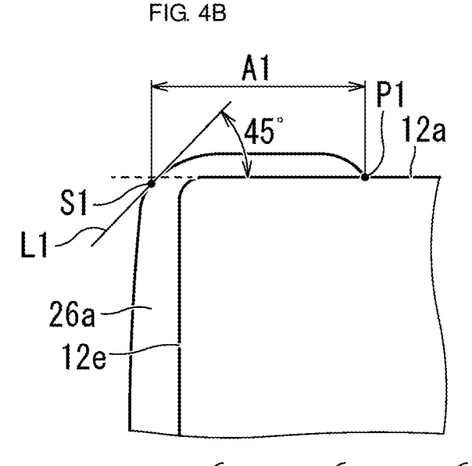
Figure 4C:
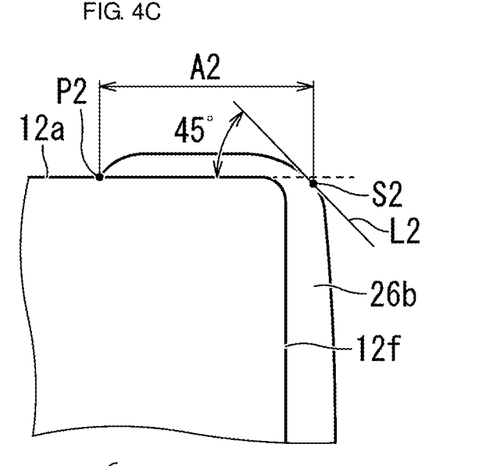

A multilayer ceramic electronic component according to a preferred embodiment of the present invention will be described. FIG. 1 is an external perspective view showing an example of the multilayer ceramic electronic component according to a preferred embodiment of the present invention. FIG. 2 is a sectional view of the section cut along line II-II in FIG. 1 and shows a cross section including L-dimension in the length direction z and T-dimension in the stacking direction x of a multilayer ceramic capacitor 10 (hereafter referred to as LT cross section), as described later. FIG. 3 is a sectional view of the section cut along line in FIG. 1. FIGS. 4A to 4C are magnified sectional views of outer electrodes and the vicinities thereof shown in the sectional view in FIG. 2.

A multilayer ceramic capacitor will be described below as an example of the multilayer ceramic electronic component.

The multilayer ceramic capacitor 10 includes a rectangular or substantially rectangular parallelepiped ceramic element assembly 12 and two outer electrodes 24.

(1) Ceramic Element Assembly

The ceramic element assembly 12 includes a plurality of ceramic layers 14 and a plurality of inner electrode layers 16, which are stacked. Further, the ceramic element assembly 12 includes a first principal surface 12a and a second principal surface 12b opposite to each other in the stacking direction x, a first side surface 12c and a second side surface 12d opposite to each other in the width direction y orthogonal or substantially orthogonal to the stacking direction x (direction bonding the first principal surface 12a and the second principal surface 12b), and a first end surface 12e and a second end surface 12f opposite to each other in the length direction z orthogonal or substantially orthogonal to the stacking direction x and the width direction y (direction bonding the first side surface 12c and the second side surface 12d). There is no particular limitation regarding the dimensions of the ceramic element assembly 12. However, regarding the ceramic element assembly 12, the dimension in the length direction z is not limited to be greater than the dimension in the width direction y.

The dimension in the length direction z of the multilayer ceramic capacitor 10 including the ceramic element assembly 12 and the two outer electrodes 24 is denoted as L-direction. The dimension in the stacking direction x of the multilayer ceramic capacitor 10 is denoted as T-direction. The dimension in the width direction y of the multilayer ceramic capacitor 10 is denoted as W-direction.

In the ceramic element assembly 12, preferably, corner portions and ridge portion are rounded, for example. The corner portions denote the portions at which three adjacent surfaces of the ceramic element assembly 12 intersect, and the ridge portions denote the portions at which two adjacent surfaces of the ceramic element assembly 12 intersect. Meanwhile, all or some of the first principal surface 12a, the second principal surface 12b, the first side surface 12c, the second side surface 12d, the first end surface 12e, and the second end surface 12f may have unevenness.

(a) Ceramic Layer

The ceramic element assembly 12 includes outer layer portions 15a that include a plurality of ceramic layers 14 and an inner layer portion 15b that includes a single or a plurality of ceramic layers 14 and a plurality of inner electrode layers 16 provided thereon. The outer layer portions 15a are located on the first principal surface 12a side and the second principal surface side of the ceramic element assembly 12 and are an aggregate of a plurality of ceramic layers 14 located between the first principal surface 12a and the inner electrode layer 16 nearest the first principal surface 12a and an aggregate of a plurality of ceramic layers 14 located between the second principal surface 12b and the inner electrode layer 16 nearest the second principal surface 12b. The region located between the two outer layer portions 15a is the inner layer portion 15b. The thickness of each outer layer portion 15a is preferably about 15 μm or more and about 400 μm or less, for example.

The number of the ceramic layers 14 including the outer layers is preferably about 10 or more and about 2,000 or less, for example.

The ceramic layers 14 may be made of, for example, a dielectric material. Examples of the dielectric material include a dielectric ceramic including $BaTiO_3$, $CaTiO_3$, $SrTiO_3$, or $CaZrO_3$ as a primary component. In the case in which the above-described dielectric material is included as a primary component, a secondary component, for example, a Mn compound, an Fe compound, a Cr compound, a Co compound, or a Ni compound with a smaller content than the primary component may be added in accordance with the predetermined characteristics of the ceramic element assembly 12.

The thickness of each ceramic layer 14 after firing is preferably about 0.5 μm or more and about 20 μm or less, for example.

(b) Inner Electrode Layer

The ceramic element assembly 12 includes, for example, a plurality of rectangular or substantially rectangular first inner electrode layers 16a and a plurality of rectangular or substantially rectangular second inner electrode layers 16b as a plurality of inner electrode layers 16. The plurality of first inner electrode layers 16a and the plurality of second inner electrode layers 16b are embedded and equidistantly or substantially equidistantly alternately stacked with the ceramic layers 14 provided therebetween in the stacking direction x of the ceramic element assembly 12.

Each first inner electrode layer 16a includes a first opposite electrode portion 18a opposing the second inner electrode layer 16b and a first extended electrode portion 20a that is located at one end side of the first inner electrode layer 16a and that extends from the first opposite electrode portion 18a to the first end surface 12e of the ceramic element assembly 12. The end portion of the first extended electrode portion 20a extends to the first end surface 12e and is exposed.

Each second inner electrode layer 16b includes a second opposite electrode portion 18b opposing the first inner electrode layer 16a and a second extended electrode portion 20b that is located at one end side of the second inner electrode layer 16b and that extends from the second opposite electrode portion 18b to the second end surface 12f of the ceramic element assembly 12. The end portion of the second extended electrode portion 20b extends to the second end surface 12f and is exposed.

The ceramic element assembly 12 includes side portions (hereafter referred to as "W-gaps") 22a of the ceramic element assembly 12 that are provided between one end of each of the first opposite electrode portion 18a and the second opposite electrode portion 18b in the width direction y and the first side surface 12c and between the other end of each of the first opposite electrode portion 18a and the second opposite electrode portion 18b in the width direction y and the second side surface 12d. In addition, the ceramic element assembly 12 includes end portions (hereafter referred to as "L-gaps") 22b of the ceramic element assembly 12 that are provided between an end portion opposite to the first extended electrode portion 20a of each of the first inner electrode layer 16a and the second end surface 12f and between an end portion opposite to the second extended electrode portion 20b of each of the second inner electrode layer 16b and the first end surface 12e.

The inner electrode layers 16 may preferably be made of, for example, a conductive material including at least one selected from Ni, Cu, Ag, Pd, Au, an Ag—Pd alloy, and the like. The inner electrode layers 16 may further include dielectric particles of the same or similar composition system as the ceramic included in the ceramic layer 14.

The thickness of each inner electrode layer 16 is preferably about 0.2 µm or more and about 2.0 µm or less, for example. Meanwhile, the number of the inner electrode layers 16 is preferably about 15 or more and about 200 or less, for example.

(2) Outer Electrode

The outer electrodes 24 are provided on the first end surface 12e side and the second end surface 12f side of the ceramic element assembly 12. The outer electrodes 24 include the first outer electrode 24a and the second outer electrode 24b.

The first outer electrode 24a is provided on the first end surface 12e of the ceramic element assembly 12 and extends from the first end surface 12e to cover a portion of each of the first principal surface 12a, the second principal surface 12b, the first side surface 12c, and the second side surface 12d. In this case, the first outer electrode 24a is electrically coupled to the first extended electrode portion 20a of the first inner electrode layer 16a.

The second outer electrode 24b is provided on the second end surface 12f of the ceramic element assembly 12 and extends from the second end surface 12f to cover a portion of each of the first principal surface 12a, the second principal surface 12b, the first side surface 12c, and the second side surface 12d. In this case, the second outer electrode 24b is electrically coupled to the second extended electrode portion 20b of the second inner electrode layer 16b.

In the ceramic element assembly 12, the first opposite electrode portion 18a of the first inner electrode layer 16a and the second opposite electrode portion 18b of the second inner electrode layer 16b are opposite to each other with the ceramic layer 14 interposed therebetween, and, thus, an electrostatic capacitance is generated. Consequently, the electrostatic capacitance is able to be provided between the first outer electrode 24a coupled to the first inner electrode layer 16a and the second outer electrode 24b coupled to the second inner electrode layer 16b, and the characteristics of a capacitor are obtained.

Each of the first outer electrode 24a and the second outer electrode 24b includes an underlying electrode layer 26 coupled to the inner electrode layer 16, a conductive resin layer stacked on the underlying electrode layer 26, and a metal plating layer 30 stacked on the conductive resin layer 28.

(a) Underlying Electrode Layer

The underlying electrode layers 26 include a first underlying electrode layer 26a and a second underlying electrode layer 26b.

The first underlying electrode layer 26a is provided on the first end surface 12e of the ceramic element assembly 12 and extends from the first end surface 12e to cover a portion of each of the first principal surface 12a, the second principal surface 12b, the first side surface 12c, and the second side surface 12d.

The second underlying electrode layer 26b is provided on the second end surface 12f of the ceramic element assembly 12 and extends from the second end surface 12f to cover a portion of each of the first principal surface 12a, the second principal surface 12b, the first side surface 12c, and the second side surface 12d.

Figure 5A:
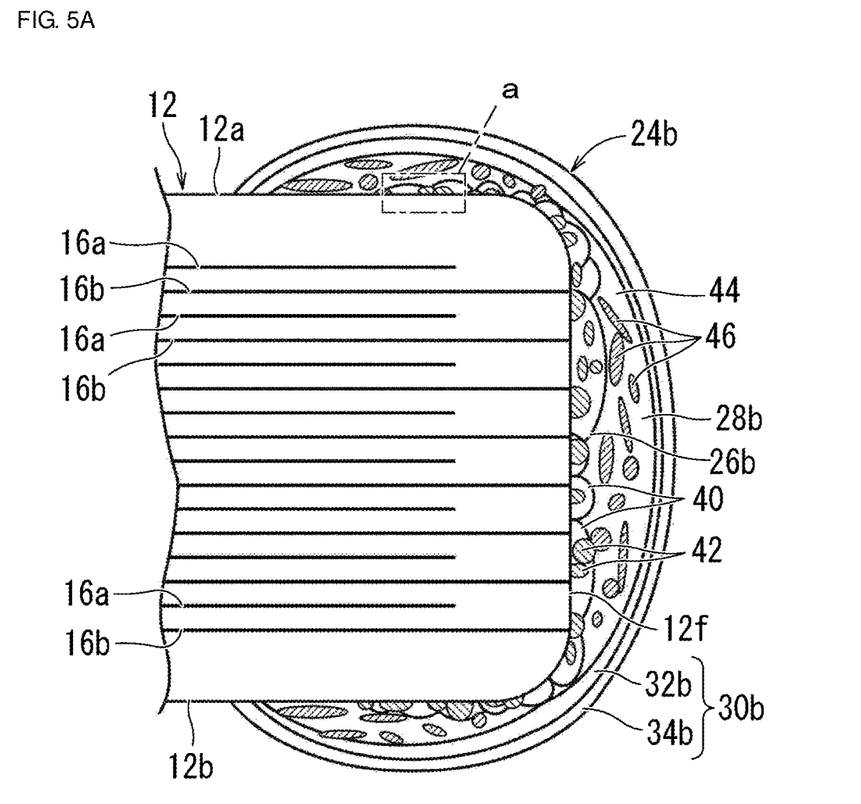
FIG. 5A is a sectional view showing the sectional view in FIG. 2.
Figure 5B:
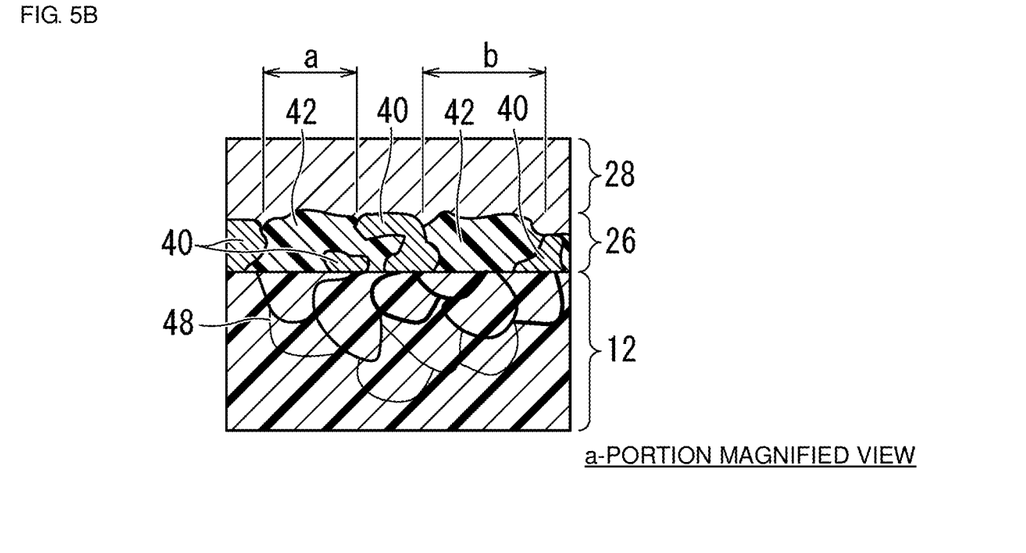
FIG. 5B is an a-portion magnified view showing a magnified underlying electrode layer and the vicinity thereof.

As shown in FIGS. 5A and 5B, each underlying electrode layer 26 includes sintered metal 40 and glass 42. FIG. 5A is a sectional view showing the sectional view in FIG. 2, and FIG. 5B is an a-portion magnified view showing a magnified underlying electrode layer 26 and the vicinity thereof. Glass 42 is present at the interface between the underlying electrode layer 26 and the conductive resin layer 28. Meanwhile, a reaction layer 48 of the ceramic and the glass 42 is present in the ceramic element assembly 12 at the interface between the underlying electrode layer 26 and the ceramic element assembly 12.

The first underlying electrode layer 26a preferably satisfies at least one condition of a first condition that a maximum exposure length of the glass 42 exposed at the interface between the first underlying electrode layer 26a and the first conductive resin layer 28a, described below in further detail, is about 3.8 µm or less and a second condition that an exposure rate of the glass 42 exposed at the interface between the first underlying electrode layer 26a and the first conductive resin layer 28a is about 10.1% or less, for example.

The second underlying electrode layer 26b preferably satisfies at least one condition of a third condition that a maximum exposure length of the glass 42 exposed at the interface between the second underlying electrode layer 26b and the second conductive resin layer 28b, described below in further detail, is about 3.8 µm or less and a fourth condition that an exposure rate of the glass 42 exposed at the interface between the second underlying electrode layer 26b and the second conductive resin layer 28b is about 10.1% or less, for example.

In an example of a method for measuring "maximum exposure length of the glass 42", the multilayer ceramic capacitor 10 is subjected to cross-sectional polishing until the LT surface at the position of about (½)W is exposed. Subsequently, as shown in FIG. 4B, in the LT cross section, the measurement range is set to be a region A1 from the end P1 of the first underlying electrode layer 26a located on the first principal surface 12a to the contact point S1 on the first underlying electrode layer 26a, to which a tangent line L1 inclined at an angle of about 45° with respect to the first principal surface 12a is tangent, in the ridge portion on the first end surface 12e side of the ceramic element assembly 12. In the region A1, the lengths a, b, . . . of the glass portions included in the first underlying electrode layer 26a and exposed at the interface between the first underlying electrode layer 26a and the first conductive resin layer 28a are measured, and the maximum length among the measured values is assumed to be the "maximum exposure length of glass".

Alternatively, as shown in FIG. 4C, in the LT cross section, the measurement range is set to be a region A2 from the end P2 of the second underlying electrode layer 26b located on the first principal surface 12a to the contact point S2 on the second underlying electrode layer 26b, to which a tangent line L2 inclined at an angle of about 45° with respect to the first principal surface 12a is tangent, in the ridge portion on the second end surface 12f side of the ceramic element assembly 12. In the region A2, the lengths a, b, . . . of the glass portions included in the second underlying electrode layer 26b and exposed at the interface between the second underlying electrode layer 26b and the second conductive resin layer 28b are measured, and the maximum length among the measured values is assumed to be the "maximum exposure length of glass".

When it is satisfied that the measured maximum exposure length of the glass is about 3.8 µm or less, the multilayer ceramic capacitor 10 having significantly increased substrate bending resistance is provided. That is, the multilayer ceramic capacitor 10 in which cracks do not readily occur even when the amount of bending increases is provided.

"Exposure rate of glass" is represented by the following equation.

exposure rate of glass={(total exposure length of glass)/(total length)}×100

In the region A1 of the LT cross section, the lengths a, b, . . . of the glass portions included in the first underlying electrode layer 26a and exposed at the interface between the first underlying electrode layer 26a and the first conductive resin layer 28a are measured, and the total length of the measured values is assumed to be the "total exposure length of glass". Alternatively, in the region A2 of the LT cross section, the lengths a, b, . . . of the glass portions included in the second underlying electrode layer 26b and exposed at the interface between the second underlying electrode layer 26b and the second conductive resin layer 28b are measured, and the total length of the measured values is assumed to be the "total exposure length of glass".

"Total length" denotes the length of the region A1 of the first underlying electrode layer 26a in the LT cross section. Alternatively, "total length" denotes the length of the region A2 of the second underlying electrode layer 26b in the LT cross section.

When it is satisfied that the exposure rate of the glass is about 10.1% or less, the multilayer ceramic capacitor 10 having significantly increased substrate bending resistance is provided. That is, the multilayer ceramic capacitor 10 in which cracks do not readily occur even when the amount of bending increases is provided.

The measurement of each of the "maximum exposure length of glass", the "total exposure length of glass", and the "total length" is performed in the region A1 of the first underlying electrode layer 26a located on the first principal surface 12a or in the region A2 of the second underlying electrode layer 26b because the thickness of each of the underlying electrode layers in the respective regions A tends to be reduced, and, in particular, the bending strength is influenced to a great extent.

Each of the "maximum exposure length of glass", the "total exposure length of glass", and the "total length" is determined by measuring the first underlying electrode layer 26a or the second underlying electrode layer 26b located on the first principal surface 12a. However, these may be determined by measuring the first underlying electrode layer 26a or the second underlying electrode layer 26b located on the second principal surface 12b.

Examples of the sintered metal 40 include at least one selected from Cu, Ni, Ag, Pb, Au, an Ag—Pb alloy, and the like. Preferably, the sintered metal powder is a mixture of a substantially spherical metal powder and a substantially flat metal powder, for example. When the sintered metal powder having an average particle diameter D50 of about 1 µm or less is included, the maximum exposure length of the glass falls within the range of about 3.8 µm or less. That is, the average particle diameter of the sintered metal powder is a main factor of the maximum exposure length of the glass, and as the average particle diameter decreases, the maximum exposure length of the glass decreases. In addition, the average particle diameter of the sintered metal powder is also a main factor of the exposure rate of the glass, and as the average particle diameter decreases, the exposure rate of the glass decreases.

The glass 42 of each underlying electrode layer 26 preferably includes at least one selected from, for example, B, Si, Pd, Ba, Mg, Al, and Li.

The underlying electrode layers 26 are produced by coating the ceramic element assembly 12 with a conductive paste including the sintered metal 40 and the glass 42 and performing baking. Firing of the conductive paste and the ceramic element assembly 12 may be performed in a single operation, or baking may be performed after the ceramic element assembly 12 is fired. The thickness of the thickest portion of each underlying electrode layer 26 is preferably about 10 µm or more and about 150 µm or less, for example.

Each underlying electrode layer 26 located on the first end surface 12e or the second end surface 12f has a shape in which the thickness of the central portion is greater than the other portion. Consequently, the connection contact angle of the solder with respect to the plating on each outer electrode 24 is an acute angle, and regarding the direction of the stress applied to the plating from the solder during a thermal shock cycle, a component that is parallel or substantially parallel to the plating plane is improved. As a result, an effect of significantly reducing the solder crack occurrence rate is able to be further provided.

In general, the thickness of each outer electrode 24 located on the underlying electrode layer 26 on the first principal surface 12a, the second principal surface 12b, the first side surface 12c, and the second side surface 12d tends to be less than the thickness of each underlying electrode layer 26 located on the first end surface 12e and the second end surface 12f and is preferably about 5 µm or more and about 20 µm or less, for example.

(b) Conductive Resin Layer

The conductive resin layers 28 include the first conductive resin layer 28a and the second conductive resin layer 28b.

The first conductive resin layer 28a is provided on the first underlying electrode layer 26a. Specifically, the first conductive resin layer 28a is provided on the first underlying electrode layer 26a located on the first end surface 12e and is provided on the first underlying electrode layer 26a located on the first principal surface 12a, the second principal surface 12b, the first side surface 12c, and the second side surface 12d.

Similarly, the second conductive resin layer 28b is provided on the second underlying electrode layer 26b. Specifically, the second conductive resin layer 28b is provided on the second underlying electrode layer 26b located on the second end surface 12f and is provided on the second underlying electrode layer 26b located on the first principal surface 12a, the second principal surface 12b, the first side surface 12c, and the second side surface 12d.

The thickness of each conductive resin layer 28 is preferably, for example, about 10 μm or more and about 200 μm or less.

As shown in FIG. 5A, the conductive resin layers 28 include a resin 44 and a metal powder 46 (conductive filler). The conductive resin layers 28 include the resin 44 and, therefore, are more flexible than, for example, the underlying electrode layers 26 and metal plating layers 30. Consequently, even when physical impact or shock due to thermal cycle is applied to the multilayer ceramic capacitor 10, conductive resin layers 28 define and function as buffer layers, and cracks of the multilayer ceramic capacitor 10 are able to be significantly reduced or prevented from occurring.

The resin 44 included in the conductive resin layers 28 is preferably a thermosetting resin, for example. Specific examples of the thermosetting resin include known various thermosetting resins, such as epoxy resins, phenol resins, urethane resins, silicone resins, and polyimide resins. Of these, epoxy resins having excellent heat resistance, moisture resistance, adhesiveness, and the like are some of the most suitable resins. Preferably, the conductive resin layers 28 include a curing agent in addition to the thermosetting resin, for example. Examples of the curing agent include known various compounds of a phenol base, an amine base, an acid anhydride base, an imidazole base, or the like when an epoxy resin is included as the base resin.

Regarding the metal powder 46 included in the conductive resin layers 28, an Ag powder or a Cu powder or an alloy powder of Ag or Cu, for example, may preferably be used. Alternatively, metal particles having surfaces coated with Ag may be used. In the case in which metal particles having surfaces coated with Ag are provided, preferably, Cu or Ni is included as metal particles, for example. Meanwhile, Cu subjected to anti-oxidation treatment may be used. Metal particles coated with Ag are included because inexpensive metal particles may be provided as the base material while maintaining the characteristics of Ag.

There is no particular limitation regarding the shape of the metal powder 46 (conductive filler) included in the conductive resin layers 28. The metal powder 46 may be a substantially spherical metal powder or a substantially flat metal powder. However, a mixture of a substantially spherical metal powder and a substantially flat metal powder may preferably be used. There is no particular limitation regarding the average particle diameter of the metal powder 46, and the average particle diameter may preferably be, for example, about 0.3 μm or more and about 10.0 μm or less. The metal powder provides conductivity of the conductive resin layers 28. Specifically, conduction paths are provided inside the conductive resin layers 28 due to direct contact of metal powders with each other and/or the conduction mechanism, for example, a tunnel effect, of a conductive adhesive. Preferably, the ends of the conductive resin layers 28 extend from the respective ends of the underlying electrode layers 26 by about 10 μm or more and about 800 μm or less, for example. As a result, the area of the conductive resin layers 28 to significantly reduce the stress during the thermal shock cycle is able to be ensured sufficiently, and a solder-crack-buffering effect is able to be provided.

(c) Metal Plating Layer

The metal plating layers 30 include a first metal plating layer 30a and a second metal plating layer 30b.

The first metal plating layer 30a is provided on the first conductive resin layer 28a. More specifically, the first metal plating layer 30a is provided on the first conductive resin layer 28a located on the first end surface 12e and is provided on the first conductive resin layer 28a located on the first principal surface 12a, the second principal surface 12b, the first side surface 12c, and the second side surface 12d.

The second metal plating layer 30b is provided on the second conductive resin layer 28b. More specifically, the second metal plating layer 30b is provided on the second conductive resin layer 28b located on the second end surface 12f and is provided on the second conductive resin layer 28b located on the first principal surface 12a, the second principal surface 12b, the first side surface 12c, and the second side surface 12d.

Examples of the material used for the first metal plating layer 30a and the second metal plating layer 30b include at least one metal selected from Cu, Ni, Sn, Ag, Pd, Au, and the like and alloys including at least one of these metals, for example, an Ag—Pd alloy. Preferably, for example, the first metal plating layer 30a has a two-layer structure including a first Ni plating layer 32a and a first Sn plating layer 34a. The second metal plating layer 30b preferably has a two-layer structure including, for example, a second Ni plating layer 32b and a second Sn plating layer 34b. The Ni plating layers 32 are able to significantly reduce or prevent the underlying electrode layers 26 from being eroded by solder during mounting of the multilayer ceramic capacitor 10. The Sn plating layers 34 significantly increases solder wettability during mounting of the multilayer ceramic capacitor 10 to facilitate mounting of the multilayer ceramic capacitor 10. The thickness per layer of the plating layer is preferably about 1 μm or more and about 15 μm or less, for example.

The dimension in the length direction z of the multilayer ceramic capacitor 10 including the ceramic element assembly 12, the first outer electrode 24a, and the second outer electrode 24b is denoted as L-dimension. The dimension in the stacking direction x of the multilayer ceramic capacitor 10 including the ceramic element assembly 12, the first outer electrode 24a, and the second outer electrode 24b is denoted as T-dimension. The dimension in the width direction y of the multilayer ceramic capacitor 10 including the ceramic element assembly 12, the first outer electrode 24a, and the second outer electrode 24b is denoted as W-dimension.

There is no particular limitation regarding the dimensions of the multilayer ceramic capacitor 10. For example, L-dimension in the length direction z is about 1.0 mm or less, W-direction in the width direction y is about 0.5 mm or less, and T-direction in the stacking direction x is about 0.5 mm or less.

2. Method for Manufacturing Multilayer Ceramic Electronic Component

A preferred embodiment of a method for manufacturing the multilayer ceramic electronic component having the above-described configuration will be described below with reference to the multilayer ceramic capacitor 10 shown in FIG. 1.

Ceramic green sheets to form the ceramic layers 14, an inner electrode conductive paste to form the inner electrode layers 16, and an outer electrode conductive paste to form the underlying electrode layers 26 of the outer electrodes 24 are prepared. The ceramic green sheets, the inner electrode conductive paste, and the outer electrode conductive paste include an organic binder and an organic solvent, and known organic binders and organic solvents may be included.

For example, the ceramic green sheets are printed with respective predetermined patterns of the inner electrode conductive paste to form the inner electrode patterns on the ceramic green sheets. The inner electrode conductive paste may be applied by a known method, for example, a screen printing method, a gravure printing method, or the like.

A predetermined number of outer layer ceramic green sheets provided with no inner electrode pattern are stacked, the ceramic green sheets provided with the respective inner electrode patterns are successively stacked thereon, and a predetermined number of outer layer ceramic green sheets are stacked thereon to produce a mother multilayer body. As the situation demands, the mother multilayer body may be pressure-bonded in the stacking direction x by a measure of isostatic press or the like.

Thereafter, the mother multilayer body is cut into predetermined shape dimensions and each green multilayer body chip is cut. At this time, the ridge portions and the corner portions of the green multilayer body chip are rounded by, for example, barrel polishing or the like. Subsequently, the resulting green multilayer body chip is fired to produce the ceramic element assembly 12. The firing temperature of the green multilayer body chip is set in accordance with the material that forms the ceramic and the material that forms the inner electrode conductive paste and is preferably about 900° C. or higher and 1,300° C. or lower, for example.

The first outer electrode 24a and the second outer electrode 24b are formed on the first end surface 12e and the second end surface 12f, respectively, of the ceramic element assembly 12. That is, the underlying electrode layer paste is applied to the first end surface 12e and the second end surface 12f of the ceramic element assembly 12 and baking is performed to form the first underlying electrode layer 26a of the first outer electrode 24a and the second underlying electrode layer 26b of the second outer electrode 24b. The baking temperature is preferably about 700° C. or higher and 900° C. or lower, for example.

The ceramic element assembly 12 provided with the underlying electrode layers 26 is placed into an agitator with substantially spherical media, and rotating barrel polishing is performed. The rotating barrel polishing removes the conductive resin layer 28 defining and functioning as the surface layer of the first underlying electrode layer 26a of four corner portions on the first end surface 12e side and removes the conductive resin layer 28 defining and functioning as the surface layer of the second underlying electrode layer 26b of four corner portions on the second end surface 12f side. Further, when the time of the rotating barrel polishing is increased, the sintered metal in the underlying electrode layers 26 exposed at the surface layers of the conductive resin layers 28 is stretched, the amount of the sintered metal 40 exposed increases, and the exposure length of the glass 42 decreases. That is, the maximum exposure length and the exposure rate of the glass 42 decrease.

Subsequently, the conductive resin layers 28 are formed. The first conductive resin layer 28a is formed by applying a resin outer electrode conductive paste including the metal powder and the thermosetting resin to cover the first underlying electrode layer 26a. At the same time, the second conductive resin layer 28b is formed by applying a resin outer electrode conductive paste including the metal powder and the thermosetting resin to cover the second underlying electrode layer 26b.

The conductive resin layer 28 are formed by heat-treating the resin outer electrode conductive paste at a temperature of about 180° C. or higher and 230° C. or lower for a time of about 10 min or more and about 60 min or less to heat-cure the thermosetting resin. Preferably, the atmosphere of the heat treatment is a $N_2$ atmosphere, for example. To significantly reduce or prevent scattering of the thermosetting resin and to significantly reduce or prevent oxidation of the metal powder, the oxygen concentration is reduced to preferably about 100 ppm or less, for example.

Subsequently, the metal plating layers 30 are formed to cover the respective conductive resin layers 28 on the first end surface 12e side and on the second end surface 12f side.

Accordingly, the multilayer ceramic capacitor 10 is produced.

3. Experimental Examples (1) Relationship Between Maximum Exposure Length of Glass and Crack Occurrence Rate (a) Sample Formation A multilayer ceramic capacitor was produced by the above-described manufacturing method. The multilayer ceramic capacitor of each of comparative example 1 and example 1 to example 5 was produced by placing a ceramic element assembly provided with the underlying electrode layers together with substantially spherical media into a rotary agitator and by adjusting the barreling time of the rotating barrel polishing to change the maximum exposure length of the glass of the underlying electrode layers. Increasing the barreling time reduced the maximum exposure length of the glass.

(b) Specifications of Multilayer Ceramic Capacitor

The specifications of the multilayer ceramic capacitor were as described below.

Size L×W×T (design value): about 1.0 mm X about 0.5 mm X about 0.5 mm

Ceramic material: $BaTiO_3$

Electrostatic capacitance: about 0.1 µF

Rated voltage: 50 V

Inner electrode: Ni

Structure of outer electrode:

Underlying electrode layer

Material for forming underlying electrode layer: sintered metal (Cu)

Thickness of underlying electrode layer: about 12 µm (thickest portion in end surface central portion), about 3 µm (thinnest portion in end surface edge portion)

Conductive resin layer

Metal powder (conductive filler): Ag

Thermosetting resin: epoxy base

Thickness of conductive resin layer: about 21 µm (thickest portion in end surface central portion), about 1 µm (thinnest portion in end surface edge portion)

Ni plating layer: thickness of about 3.0 µm

Sn plating layer: thickness of about 3.0 µm (c) Method of Bending Test

The resulting multilayer ceramic capacitor was subjected to a bending test. A sample of the multilayer ceramic capacitor was mounted on a JEITA substrate (glass epoxy substrate) having a thickness of about 1.6 mm by solder. Mechanical stress was applied from the substrate surface not used for mounting by a pressing jig to bend the substrate. At this time, the holding time was set to be about 5 seconds, and the amount of bending was set to be about 8 mm. After the substrate was bent, the sample of the multilayer ceramic capacitor was removed from the substrate, and the cross section (LT cross section) was polished in the direction perpendicular to the substrate surface up to the position of about (½)W of the multilayer ceramic capacitor. Subsequently, the maximum exposure length of the glass of the underlying electrode layer in the LT cross section was measured. Cracks of the ceramic element assembly in the LT cross section was observed, and the proportion of samples in which cracks occurred was calculated. The crack occurrence rate of about 20% or less was rated as acceptable.

Figure 6:
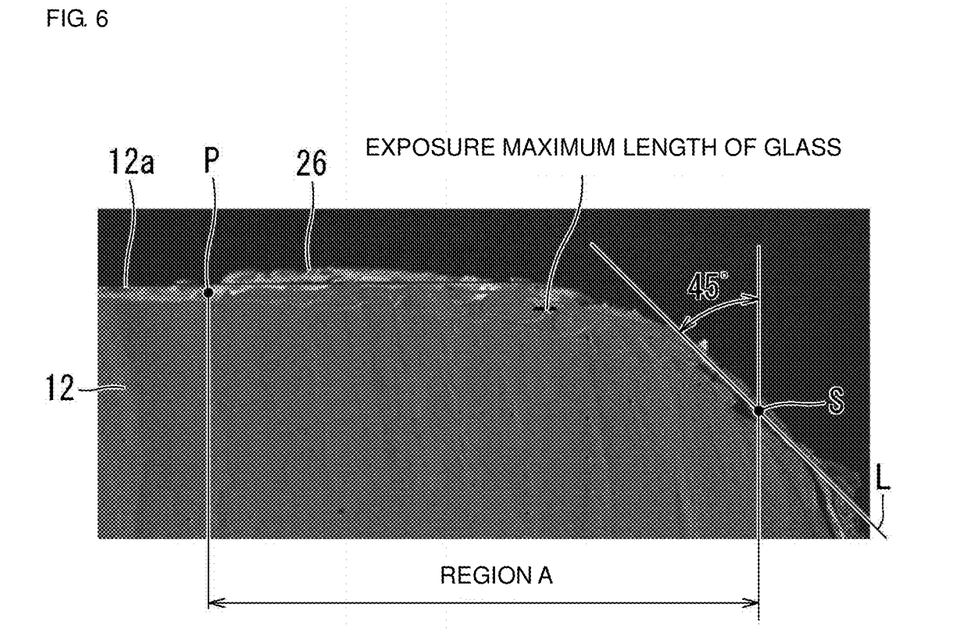
FIG. 6 is an LT-section photograph to measure the maximum exposure length of glass.

FIG. 6 is an LT-section photograph to measure the maximum exposure length of the glass of the underlying electrode layer. The measurement range was set to be a region A from the end P of the underlying electrode layer 26 located on the first principal surface 12a to the contact point S on the underlying electrode layer, to which a tangent line L inclined at an angle of about 45° with respect to the first principal surface 12a was tangent, in the ridge portion on the second end surface 12f side. In the LT-section photograph, the outer electrode is the underlying electrode layer only. However, in the actual structure, the conductive resin layer and the metal plating layer are provided on the underlying electrode layer.

Figure 7:
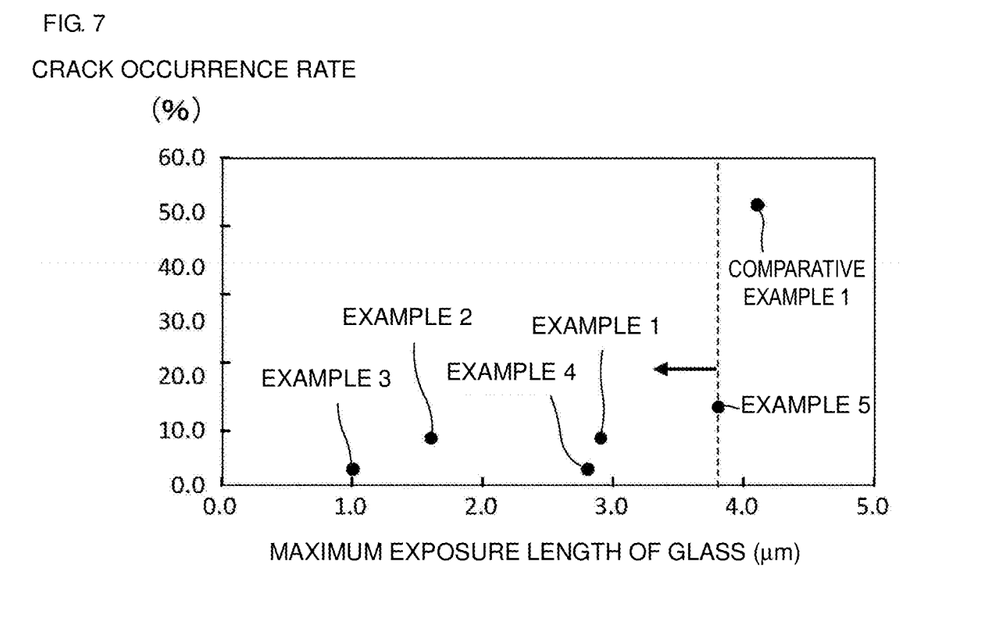
FIG. 7 is a graph showing the relationship between the maximum exposure length of glass and the crack occurrence rate.

The results of examination of the relationship between the maximum exposure length of the glass of the underlying electrode layer and the crack occurrence rate of the multilayer ceramic capacitor are shown in Table 1. In addition, FIG. 7 is a graph showing the relationship between the maximum exposure length of the glass and the crack occurrence rate on the basis of Table 1.

TABLE 1

|  | Comparative example 1 | Example 1 | Example 2 | Example 3 | Example 4 | Example 5 |
|---|---|---|---|---|---|---|
| Maximum exposure length of glass (μm) | 4.1 | 2.9 | 1.6 | 1.0 | 2.8 | 3.8 |
| Crack occurrence rate (%) | 51.4 | 8.6 | 8.6 | 2.9 | 2.9 | 14.3 |

As shown in Table 1, in each of example 1 to example 5, since the maximum exposure length of the glass was about 3.8 μm or less, the crack occurrence rate of the ceramic element assembly after the bending test was low, and a favorable result was obtained.

On the other hand, in comparative example 1, it was found that since the maximum exposure length of the glass was more than 3.8 μm, many cracks occurred in the ceramic element assembly after the bending test.

(2) Relationship Between Exposure Rate of Glass and Crack Occurrence Rate
(a) Sample Formation
A multilayer ceramic capacitor was produced by the above-described manufacturing method. The multilayer ceramic capacitor of each of comparative example 2 and example 6 to example 10 was produced by placing a ceramic element assembly provided with the underlying electrode layers together with substantially spherical media into a rotary agitator and by adjusting the barreling time of the rotating barrel polishing to change the exposure rate of the glass of the underlying electrode layers. Increasing the barreling time reduced the exposure rate of the glass.
(b) Specifications of Multilayer Ceramic Capacitor
The specifications of the multilayer ceramic capacitor were as described above, and detailed explanations thereof are omitted.
(c) Method of Bending Test
The resulting multilayer ceramic capacitor was subjected to a bending test. A sample of the multilayer ceramic capacitor was mounted on a JEITA substrate (glass epoxy substrate) having a thickness of about 1.6 mm by solder. Mechanical stress was applied from the substrate surface not used for mounting by a pressing jig to bend the substrate. At this time, the holding time was set to be 5 seconds, and the amount of bending was set to be 8 mm. After the substrate was bent, the sample of the multilayer ceramic capacitor was removed from the substrate, and the cross section (LT cross section) was polished in the direction perpendicular to the substrate surface up to the position of about (½)W of the multilayer ceramic capacitor. Subsequently, the exposure rate of the glass of the underlying electrode layer in the LT cross section was measured. Cracks of the ceramic element assembly in the LT cross section was observed, and the proportion of samples in which cracks occurred was calculated. The crack occurrence rate of about 20% or less was rated as acceptable.

Figure 8:
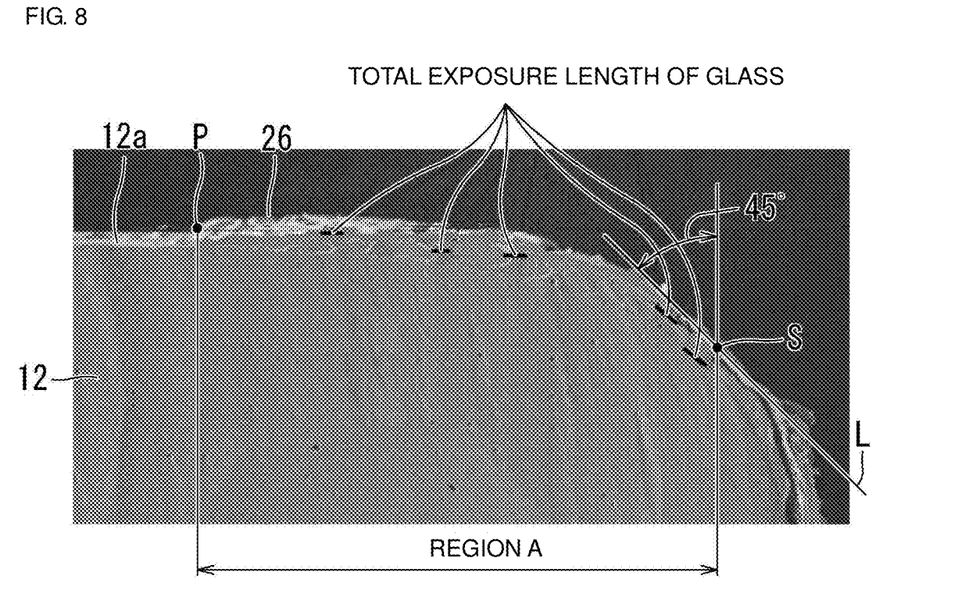
FIG. 8 is an LT-section photograph to measure the total exposure length of glass and the total length of an a-region.

FIG. 8 is an LT-section photograph to measure the exposure rate of the glass of the underlying electrode layer. The measurement range was set to be a region A from the end P of the underlying electrode layer 26 located on the first principal surface 12a to the contact point S on the underlying electrode layer, to which a tangent line L inclined at an angle of about 45° with respect to the first principal surface 12a was tangent, in the ridge portion on the second end surface 12f side. In the LT-section photograph, the outer electrode is the underlying electrode layer only. However, in the actual structure, the conductive resin layer and the metal plating layer are provided on the underlying electrode layer.

Figure 9:
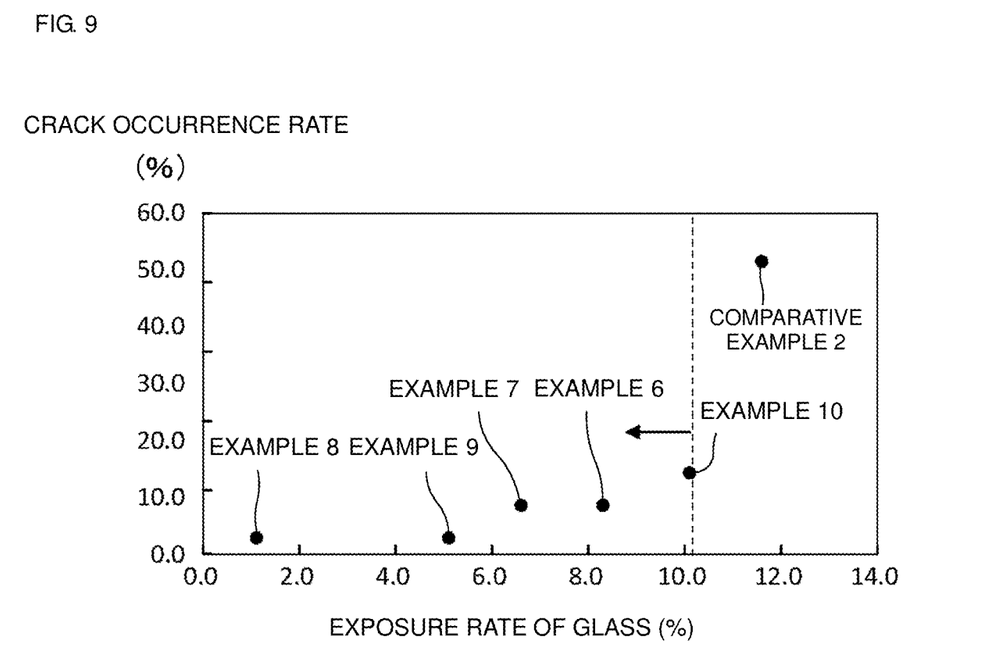
FIG. 9 is a graph showing the relationship between the exposure rate of glass and the crack occurrence rate.

The results of examination of the relationship between the exposure rate of the glass of the underlying electrode layer and the crack occurrence rate of the multilayer ceramic capacitor are shown in Table 2. In addition, FIG. 9 is a graph showing the relationship between the exposure rate of the glass and the crack occurrence rate on the basis of Table 2.

TABLE 2

|  | Comparative example 2 | Example 6 | Example 7 | Example 8 | Example 9 | Example 10 |
|---|---|---|---|---|---|---|
| Exposure rate of glass (%) | 11.6 | 8.3 | 6.6 | 1.1 | 5.1 | 10.1 |
| Crack occurrence rate (%) | 51.4 | 8.6 | 8.6 | 2.9 | 2.9 | 14.3 |

As shown in Table 2, in each of example 6 to example 10, since the exposure rate of the glass was about 10.1% or less, the crack occurrence rate of the ceramic element assembly after the bending test was low, and a favorable result was obtained.

On the other hand, in comparative example 2, it was found that since the exposure rate of the glass was more than 10.1%, many cracks occurred in the ceramic element assembly after the bending test.

A preferred embodiment of the present invention is as disclosed above. However, the present invention is not limited to this.

The mechanism, the shape, the material, the amount, the location, the arrangement, or the like of the above-described preferred embodiment may be variously modified within the bounds of not departing from the technical idea and purpose of the present invention, and the modifications are included in the present invention.

That is, in the above-described preferred embodiment and examples, the dielectric ceramic is included as the material that forms the ceramic element assembly. However, in the present invention, a magnetic ceramic, for example, ferrite, a semiconductor ceramic, for example, a spinel-based ceramic, or a piezoelectric ceramic, for example, a PZT-based ceramic may also be used as the material that forms the ceramic element assembly in accordance with the type of the multilayer ceramic electronic component.

The multilayer ceramic electronic component defines and functions as a multilayer ceramic inductor in the case in which the magnetic ceramic is used as the ceramic element assembly, defines and functions as a multilayer ceramic thermistor in the case in which the semiconductor ceramic is used, and defines and functions as a multilayer ceramic piezoelectric component in the case in which the piezoelectric ceramic is used. When the multilayer ceramic electronic component defines and functions as the multilayer ceramic inductor, the inner electrode layer is set to be a coil-shaped conductor.

In the above-described preferred embodiment and examples, the multilayer ceramic capacitor having a specific configuration has been explained as an example. However, the configuration of the multilayer ceramic capacitor according to the present invention may be freely changed within the scope of the configuration specified by the claims.

The multilayer ceramic electronic components according to preferred embodiments of the present invention are particularly favorably used as, for example, multilayer ceramic capacitors, multilayer ceramic inductors, multilayer ceramic thermistors, and multilayer ceramic piezoelectric components.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising; a ceramic element assembly that includes a first inner electrode and a second inner electrode and that includes a first principal surface and a second principal surface opposite to each other, a first side surface and a second side surface opposite to each other in a direction orthogonal or substantially orthogonal to a direction bonding the first principal surface and the second principal surface, and a first end surface and a second end surface opposite to each other in a direction orthogonal or substantially orthogonal to the direction bonding the first principal surface and the second principal surface and in a direction orthogonal or substantially orthogonal to a direction bonding the first side surface and the second side surface; a first outer electrode on the first end surface of the ceramic element assembly, electrically coupled to the first inner electrode, and extending from the first end surface to cover a portion of each of the first principal surface, the second principal surface, the first side surface, and the second side surface; and a second outer electrode on the second end surface of the ceramic element assembly, electrically coupled to the second inner electrode, and extending from the second end surface to cover a portion of each of the first principal surface, the second principal surface, the first side surface, and the second side surface; wherein the first outer electrode includes a first underlying electrode layer on the ceramic element assembly and including a first sintered metal and a first glass, and a first conductive resin layer on the first underlying electrode layer and including a first metal filler and a first resin; the second outer electrode includes a second underlying electrode layer on the ceramic element assembly and including a second sintered metal and a second glass, and a second conductive resin layer on the second underlying electrode layer and including a second metal filler and a second resin; the first underlying electrode layer satisfies at least one condition of a first condition that a maximum exposure length of the first glass exposed at the interface between the first underlying electrode layer and the first conductive resin layer is about 3.8 μm or less and a second condition that an exposure rate of the first glass exposed at the interface between the first underlying electrode layer and the first conductive resin layer is about 10.1% or less; and the second underlying electrode layer satisfies at least one condition of a third condition that a maximum exposure length of the second glass exposed at the interface between the second underlying electrode layer and the second conductive resin layer is about 3.8 μm or less and a fourth condition that an exposure rate of the second glass exposed at the interface between the second underlying electrode layer and the second conductive resin layer is about 10.1% or less.

2. The multilayer ceramic electronic component according to claim 1, wherein
the first underlying electrode layer satisfies the first condition and the second condition; and the second underlying electrode layer satisfies the third condition and the fourth condition.

3. The multilayer ceramic electronic component according to claim 1, wherein
the first outer electrode includes a first metal plating layer on the first conductive resin layer; and
the second outer electrode includes a second metal plating layer on the second conductive resin layer.

4. The multilayer ceramic electronic component according to claim 1, wherein a length in the direction bonding the first end surface and the second end surface is about 1.0 mm or less, a length in the direction bonding the first side surface and the second side surface is about 0.5 mm or less, and a length in the direction bonding the first principal surface and the second principal surface is about 0.5 mm or less.

5. The multilayer ceramic electronic component according to claim 1, wherein the ceramic element assembly includes a capacitor having a multilayer structure including a plurality of inner electrode layers defining the inner electrode and a plurality of ceramic dielectric layers that are alternately stacked.

6. The multilayer ceramic electronic component according to claim 1, wherein the first glass and the second glass include the same or substantially the same material.

7. The multilayer ceramic electronic component according to claim 1, wherein the first glass and the second glass each includes at least one of B, Si, Pd, Ba, Mg, Al, and Li.

8. The multilayer ceramic electronic component according to claim 1, wherein the first sintered metal and the second sintered metal each includes at least one selected of Cu, Ni, Ag, Pb, Au, and an Ag—Pb alloy.

9. The multilayer ceramic electronic component according to claim 1, wherein the first sintered metal and the second sintered metal each includes a sintered metal powder that is a mixture of a substantially spherical metal powder and a substantially flat metal powder.

10. The multilayer ceramic electronic component according to claim 1, wherein a thickness of each of the first underlying electrode layer and the second underlying electrode layer is between about 5 μm and about 20 μm.

11. The multilayer ceramic electronic component according to claim 1, wherein a thickness of each of the first underlying electrode layer and the second underlying electrode layer is greater in a central portion than in an outer portion.

12. The multilayer ceramic electronic component according to claim 1, wherein the first resin and the second resin are each a thermosetting resin.

13. The multilayer ceramic electronic component according to claim 1, wherein the first metal filler and the second metal filler are each an Ag powder, a Cu powder, or an alloy powder of Ag or Cu.

* * * * *